(12) United States Patent
Duston et al.

(10) Patent No.: US 7,290,876 B2
(45) Date of Patent: Nov. 6, 2007

(54) METHOD AND SYSTEM FOR ELECTRO-ACTIVE SPECTACLE LENS DESIGN

(75) Inventors: Dwight P. Duston, Laguna Niguel, CA (US); William Kokonaski, Gig Harbor, WA (US)

(73) Assignee: E-Vision, LLC, Roanoke, VA (US)

( * ) Notice: Subject to any disclaimer, the term of this patent is extended or adjusted under 35 U.S.C. 154(b) by 0 days.

(21) Appl. No.: 11/183,454

(22) Filed: Jul. 18, 2005

(65) Prior Publication Data
US 2006/0023004 A1 Feb. 2, 2006

Related U.S. Application Data

(63) Continuation-in-part of application No. 10/626,973, filed on Jul. 25, 2003, now Pat. No. 6,918,670, which is a continuation of application No. 09/602,013, filed on Jun. 23, 2000, now Pat. No. 6,619,799.

(60) Provisional application No. 60/591,598, filed on Jul. 28, 2004, provisional application No. 60/161,363, filed on Oct. 26, 1999, provisional application No. 60/150,545, filed on Aug. 25, 1999, provisional application No. 60/150,564, filed on Aug. 25, 1999, provisional application No. 60/147,813, filed on Aug. 10, 1999, provisional application No. 60/143,626, filed on Jul. 14, 1999, provisional application No. 60/142,053, filed on Jul. 2, 1999.

(51) Int. Cl.
*G02C 7/02* (2006.01)
(52) U.S. Cl. .................................................. 351/177
(58) Field of Classification Search ................ 351/159, 351/177
See application file for complete search history.

(56) References Cited

U.S. PATENT DOCUMENTS

| 2,437,642 A | 3/1948 | Henroleau |
| 2,578,581 A | 11/1951 | Edwards |
| 3,161,718 A | 12/1964 | de Luca |
| 3,245,315 A | 4/1966 | Marks et al. |
| 3,309,162 A | 3/1967 | Kosanke |
| 3,614,215 A | 10/1971 | Mackta |

(Continued)

FOREIGN PATENT DOCUMENTS

EP 0154962 A2 9/1985

(Continued)

OTHER PUBLICATIONS

"Focusing by Electrical Modulation of Refraction in a Liquid Crystal Cell"; Stephen T. Kowell, et al., *Applied Optics*, vol. 23, No. 2, Jan. 15, 1984, pp. 278-289.

(Continued)

*Primary Examiner*—Jordan M. Schwartz
(74) *Attorney, Agent, or Firm*—Pearl Cohen Zedek Latzer, LLP

(57) ABSTRACT

A method and system for designing electro-active lenses adapted to correct for a higher-order aberration, whereby a desired pixel size is determined. In certain embodiments, the desired pixel size may be determined by identifying a desired pixel size for an electro-active lens adapted to correct for a conventional aberration.

4 Claims, 3 Drawing Sheets

U.S. PATENT DOCUMENTS

| | | |
|---|---|---|
| 3,738,734 A | 6/1973 | Tait et al. |
| 3,791,719 A | 2/1974 | Kratzer et al. |
| 4,174,156 A | 11/1979 | Glorieux |
| 4,181,408 A | 1/1980 | Senders |
| 4,190,330 A | 2/1980 | Berreman |
| 4,264,154 A | 4/1981 | Petersen |
| 4,279,474 A | 7/1981 | Belgorod |
| 4,300,818 A | 11/1981 | Schachar |
| 4,373,218 A | 2/1983 | Schachar |
| 4,395,736 A | 7/1983 | Fraleux |
| 4,418,990 A | 12/1983 | Gerber |
| 4,423,929 A | 1/1984 | Gomi |
| 4,457,585 A | 7/1984 | DuCorday |
| 4,466,703 A | 8/1984 | Nishimoto |
| 4,466,706 A | 8/1984 | Lamothe, II |
| 4,529,268 A | 7/1985 | Brown |
| 4,564,267 A | 1/1986 | Nishimoto |
| 4,572,616 A | 2/1986 | Kowel et al. |
| 4,577,928 A | 3/1986 | Brown |
| 4,601,545 A | 7/1986 | Kern |
| 4,609,824 A | 9/1986 | Munier et al. |
| 4,712,870 A | 12/1987 | Robinson et al. |
| 4,756,605 A | 7/1988 | Okada et al. |
| 4,772,094 A | 9/1988 | Sheiman |
| D298,250 S | 10/1988 | Kildall |
| 4,787,733 A | 11/1988 | Silva |
| 4,796,248 A | 1/1989 | Ozaki et al. |
| 4,813,777 A | 3/1989 | Rainville et al. |
| 4,818,095 A | 4/1989 | Takeuchi |
| 4,836,652 A | 6/1989 | Oishi et al. |
| 4,842,400 A | 6/1989 | Klein |
| 4,880,300 A | 11/1989 | Payner et al. |
| 4,904,063 A | 2/1990 | Okada et al. |
| 4,907,860 A | 3/1990 | Noble |
| 4,919,520 A | 4/1990 | Okada et al. |
| 4,921,728 A | 5/1990 | Takiguchi |
| 4,927,241 A | 5/1990 | Kuijk |
| 4,929,865 A | 5/1990 | Blum |
| 4,930,884 A | 6/1990 | Tichenor et al. |
| 4,944,584 A | 7/1990 | Maeda et al. |
| 4,945,242 A | 7/1990 | Berger et al. |
| 4,952,788 A | 8/1990 | Berger et al. |
| 4,958,907 A | 9/1990 | Davis |
| 4,961,639 A | 10/1990 | Lazarus |
| 4,968,127 A | 11/1990 | Russell et al. |
| 4,981,342 A | 1/1991 | Fiala |
| 4,991,951 A | 2/1991 | Mizuno et al. |
| 5,015,086 A | 5/1991 | Okaue et al. |
| 5,030,882 A | 7/1991 | Solero |
| 5,050,981 A | 9/1991 | Roffman |
| 5,066,301 A | 11/1991 | Wiley |
| 5,067,795 A | 11/1991 | Senatore |
| 5,073,021 A | 12/1991 | Marron |
| 5,076,665 A | 12/1991 | Petersen |
| 5,091,801 A | 2/1992 | Ebstein |
| 5,108,169 A | 4/1992 | Mandell |
| 5,114,628 A | 5/1992 | Hofer et al. |
| 5,130,856 A | 7/1992 | Tichenor et al. |
| 5,142,411 A | 8/1992 | Fiala |
| 5,150,234 A | 9/1992 | Takahashi et al. |
| 5,171,266 A | 12/1992 | Wiley et al. |
| 5,182,585 A | 1/1993 | Stoner |
| 5,184,156 A | 2/1993 | Black et al. |
| 5,200,859 A | 4/1993 | Payner et al. |
| 5,208,688 A | 5/1993 | Fergason et al. |
| 5,229,885 A | 7/1993 | Quaglia |
| 5,231,430 A | 7/1993 | Kohayakawa |
| 5,239,412 A | 8/1993 | Naka et al. |
| D342,063 S | 12/1993 | Howitt et al. |
| 5,306,926 A | 4/1994 | Yonemoto |
| 5,324,930 A | 6/1994 | Jech, Jr. |
| D350,342 S | 9/1994 | Sack |
| 5,352,886 A | 10/1994 | Kane |
| 5,359,444 A | 10/1994 | Piosenka et al. |
| 5,375,006 A | 12/1994 | Haas |
| 5,382,986 A | 1/1995 | Black et al. |
| 5,386,308 A | 1/1995 | Michel et al. |
| 5,424,927 A | 6/1995 | Schaller et al. |
| 5,440,357 A | 8/1995 | Quaglia |
| 5,443,506 A | 8/1995 | Garabet |
| 5,451,766 A | 9/1995 | Van Berkel |
| 5,488,439 A | 1/1996 | Weltmann |
| 5,522,323 A | 6/1996 | Richard |
| 5,552,841 A | 9/1996 | Gallorini et al. |
| 5,615,588 A | 4/1997 | Gottschald |
| 5,654,786 A | 8/1997 | Bylander |
| 5,682,223 A | 10/1997 | Menezes et al. |
| RE35,691 E | 12/1997 | Theirl et al. |
| 5,712,721 A | 1/1998 | Large |
| 5,728,155 A | 3/1998 | Anello et al. |
| 5,739,959 A | 4/1998 | Quaglia |
| 5,777,719 A | 7/1998 | Williams et al. |
| 5,815,233 A | 9/1998 | Morokawa et al. |
| 5,815,239 A | 9/1998 | Chapman et al. |
| 5,861,936 A | 1/1999 | Sorensen |
| 5,877,876 A | 3/1999 | Birdwell |
| 5,900,720 A | 5/1999 | Kallman et al. |
| 5,949,521 A | 9/1999 | Williams et al. |
| 5,953,098 A | 9/1999 | Lieberman et al. |
| 5,963,300 A | 10/1999 | Horwitz |
| 5,971,540 A | 10/1999 | Ofner |
| 5,980,037 A | 11/1999 | Conway |
| 6,050,687 A | 4/2000 | Bille et al. |
| 6,086,204 A | 7/2000 | Magnante |
| 6,095,651 A | 8/2000 | Williams et al. |
| 6,099,117 A | 8/2000 | Gregory |
| 6,115,177 A | 9/2000 | Vossler |
| 6,145,987 A | 11/2000 | Baude et al. |
| 6,191,881 B1 | 2/2001 | Tajima |
| 6,213,602 B1 | 4/2001 | Smarto |
| 6,271,915 B1 | 8/2001 | Frey et al. |
| 6,305,802 B1 | 10/2001 | Roffman et al. |
| 6,325,508 B1 | 12/2001 | Decreton et al. |
| 6,350,031 B1 | 2/2002 | Lashkari et al. |
| 6,396,622 B1 | 5/2002 | Alden |
| 6,437,762 B1 | 8/2002 | Birdwell |
| 6,437,925 B1 | 8/2002 | Nishioka |
| 6,464,363 B1 | 10/2002 | Nishioka et al. |
| 6,491,394 B1 | 12/2002 | Blum et al. |
| 6,501,443 B1 | 12/2002 | McMahon |
| 6,554,425 B1 | 4/2003 | Roffman et al. |
| 6,609,794 B2 | 8/2003 | Levine |
| 6,614,408 B1 | 9/2003 | Mann |
| 6,616,275 B1 | 9/2003 | Dick et al. |
| 6,616,279 B1 | 9/2003 | Davis et al. |
| 6,626,532 B1 | 9/2003 | Nishioka et al. |
| 6,631,001 B2 | 10/2003 | Kuiseko |
| 6,682,195 B2 | 1/2004 | Dreher |
| 6,709,108 B2 | 3/2004 | Levine et al. |
| 6,738,199 B2 | 5/2004 | Nishioka |
| 6,768,536 B2 | 7/2004 | Okuwaki et al. |
| 6,833,938 B2 | 12/2004 | Nishioka |
| 6,851,805 B2 | 2/2005 | Blum et al. |
| 6,918,670 B2 | 7/2005 | Blum et al. |
| 6,948,818 B2 | 9/2005 | Williams et al. |
| 6,986,579 B2 | 1/2006 | Blum et al. |
| 7,009,757 B2 | 3/2006 | Nishioka et al. |
| 7,019,890 B2 | 3/2006 | Meredith et al. |
| 7,041,133 B1 | 5/2006 | Azar |
| 7,133,172 B2 | 11/2006 | Nishioka |
| 2002/0140899 A1 | 10/2002 | Blum et al. |
| 2002/0145701 A1 | 10/2002 | Sun et al. |
| 2002/0149739 A1 | 10/2002 | Perrott et al. |
| 2002/0186346 A1 | 12/2002 | Stantz et al. |

| | | | |
|---|---|---|---|
| 2003/0151721 | A1 | 8/2003 | Lai et al. |
| 2003/0210377 | A1 | 11/2003 | Blum et al. |
| 2004/0008319 | A1* | 1/2004 | Lai et al. .................... 351/159 |
| 2004/0108971 | A1 | 6/2004 | Waldern et al. |
| 2004/0117011 | A1 | 6/2004 | Aharoni et al. |
| 2004/0130677 | A1 | 7/2004 | Liang et al. |
| 2004/0179280 | A1 | 9/2004 | Nishioka |
| 2004/0196435 | A1 | 10/2004 | Dick et al. |
| 2004/0246440 | A1* | 12/2004 | Andino et al. .............. 351/177 |
| 2005/0073739 | A1 | 4/2005 | Meredith |
| 2005/0124983 | A1 | 6/2005 | Frey et al. |
| 2006/0044510 | A1 | 3/2006 | Williams et al. |

FOREIGN PATENT DOCUMENTS

| | | |
|---|---|---|
| GB | 2170613 A | 8/1986 |
| GB | 2169417 A | 7/1987 |
| JP | 55-076323 | 5/1980 |
| JP | 10366043 | 12/1998 |
| JP | 11352445 | 12/1998 |
| WO | WO 92/01417 | 2/1992 |
| WO | WO 98/27863 | 7/1998 |
| WO | WO 99/27334 | 6/1999 |
| WO | WO-03/050472 A1 | 6/2003 |
| WO | WO-03/068059 A2 | 8/2003 |
| WO | WO-2004/008189 A1 | 1/2004 |
| WO | WO-2004/015481 A1 | 2/2004 |
| WO | WO-2004/034095 A2 | 4/2004 |
| WO | WO-2004/072687 A2 | 8/2004 |

OTHER PUBLICATIONS

"Vision Through a Liquid-Crystal Spatial Light Modulator"; Larry N. Thibos, et al., *Inpress*, Adaptive Optics Conference, Durham, United Kingdom, 1999.

"Requirements for Segmented Spatial Light Modulators for Diffraction-Limited Imaging Through Aberrated Eyes"; Larry N. Thibos, et al., *Inpress*, Adaptive Optics Conference, Durham, United Kingdom, 1999.

"Use of Liquid-Crystal Adaptive-Optics to Alter the Refractive State of the Eye"; Larry N. Thibos, et al., *Optometry and Vision Science*, vol. 74 No. 7, Jul. 1997.

"Electronic Spectacles for the 21st Century"; *Indiana Journal of Optometry*, vol. 2, No. 1, 1999.

"Adaptive Optics: Liquid Crystals Lower the Cost of Adaptive Optic"; M. Anderson, *Laser Focus World*, Dec. 1999, pp. 1-3.

"Control Optimization of Spherical Modal Liquid Crystal Lenses"; A.F. Naumov & G.D. Love, *Optics Express*, vol. 4, No. 9, Apr. 26, 2999, pp. 344-352.

"Liquid Crystal Adaptive Lenses with Modal Control"; A.F. Naumov & M. Yu Loktev, *Optics Letters*, vol. 23, No. 13, Jul. 1, 1998, pp. 992-994.

"Liquid Lenses Eye Commerical Breakthrough"; (Internet Article under "Optics.org") from *Opto & Laser*, Nov. 2003.

Davis, Robert A.; Computer Vision Syndrome—The Eyestrain Epidemic ; Review of Optometry, Sep. 15, 1997.

Lazarus, Stuart M.; The Use of Yoked Base-Up and Base-In Prism for Reducing Eye Strain at the Computer; Journal of the American Optometric Association, Apr. 1996.

Eyecare Business, Oct. 1997.

* cited by examiner

METHOD AND SYSTEM FOR ELECTRO-ACTIVE SPECTACLE LENS DESIGN

CROSS REFERENCE TO RELATED APPLICATIONS

This application is a continuation-in-part of U.S. patent application Ser. No. 10/626,973, titled "System, Apparatus, and Method for Correcting Vision Using an Electro-Active Lens", filed on 25 Jul. 2003, now U.S. Pat. No. 6,918,670, which is, in turn, a continuation of U.S. patent application Ser. No. 09/602,013 filed on Jun. 23, 2000, now U.S. Pat. No. 6,619,799.

This invention also relates to the following U.S. Patent Applications, which claim the same priority as U.S. patent application Ser. No. 11/091,104, titled "EA Spectacles", filed on 28 Mar. 2005, which is, in turn, a continuation of U.S. patent application Ser. No. 09/602,013, titled "Optical Lens System with Electro-Active Lens Having Alterably Different Focal Lengths", filed 23 Jun. 2000, now U.S. Pat. No. 6,619,799, and which, in turn, claims priority to the following U.S. Provisional Patent Applications:

- Ser. No. 60/142,053, titled "Electro-Active Spectacles", filed 2 Jul. 1999;
- Ser. No. 60/143,626 titled "Electro-Active Spectacles", filed 14 Jul. 1999;
- Ser. No. 60/147,813, titled "Electro-Active Refraction, Dispensing, & Eyewear", filed 10 Aug. 1999;
- Ser. No. 60/150,545 titled "Advanced Electro-Active Spectacles", filed 25 Aug. 1999;
- Ser. No. 60/150,564 titled "Electro-Active Refraction, Dispensing, & Eyewear", filed 25 Aug. 1999;
- Ser. No. 60/161,363 titled "Comprehensive Electro-Active Refraction, Dispensing, & Eyewear", filed 26 Oct. 1999;
- Ser. No. 60/591,598 titled "Electro-Active Spectacle Lens Design", filed 28 Jul. 2004;

This invention also relates to the following U.S. Patent Applications, which have the same priority filing as U.S. Pat. No. 6,619,799 referenced above, and which are incorporated herein by reference in their entirety:

- Ser. No. 09/602,012 titled "System, Apparatus, and Method for Correcting Vision Using Electro-Active Spectacles", filed Jun. 23, 2000, now U.S. Pat. No. 6,517,203;
- Ser. No. 09/602,014 titled "Method for Refracting and Dispensing Electro-Active Spectacles", filed Jun. 23, 2000, now U.S. Pat. No. 6,491,394;
- Ser. No. 09/603,736 titled "System, Apparatus, and Method for Reducing Birefringence", filed Jun. 23, 2000, now U.S. Pat. No. 6,491,391.

FIELD OF THE INVENTION

The present invention relates to the field of vision correction, more particularly to electro-active spectacle lenses with multiple focal lengths.

SUMMARY OF THE INVENTION

Electro-active lenses are an innovative approach to creating spectacles with multiple focal lengths over the same area of the lens. Some electro-active lenses are deigned to correct for spherically symmetric (lower-order) aberrations of the eye (e.g., myopia, hyperopia, and presbyopia). This spherical symmetry allows designs that use patterned circular electrodes to create zones in the lens of varying index of refraction. By controlling the index variation, portions of a lightwave can be retarded and made to focus like a conventional optical lens.

Higher order aberrations that are not spherically symmetric, however, do not lend themselves to simple geometries of electrode patterning. Rather, they may require many electrodes of various shapes including, by way of example only, square or hexagonal, closely packed to allow one to create arbitrary patterns of refractive index in the electro-active lens for wavefront correction. These small electrodes are similar to the picture elements or pixels in a display panel: hundreds or thousands of pixels, each individually addressable with a distinct voltage, each one capable of retarding a portion of a lightwave and correcting many types of high-order aberration.

In a spectacle lens, the pixelated area will likely be nearly circular, as is the lens itself. However, a fundamental question remains unanswered. How many pixels will be required to adequately resolve a typical aberration?

It is an object of the present invention to determine the number of pixels required to adequately resolve a typical aberration.

In an exemplary embodiment of the invention, some simple assumptions about the aperture and the resolution can be used to estimate the number of pixels needed to achieve adequate correction. The number of pixels needed to achieve adequate resolution is estimated by determining the number of piston-like pixels required per unit distance to adequately mimic a smooth surface.

Aspects of the present invention will now be described in more detail with reference to exemplary embodiments thereof as shown in the appended drawings.

DETAILED DESCRIPTION OF PREFERRED EMBODIMENTS

Figure 1:
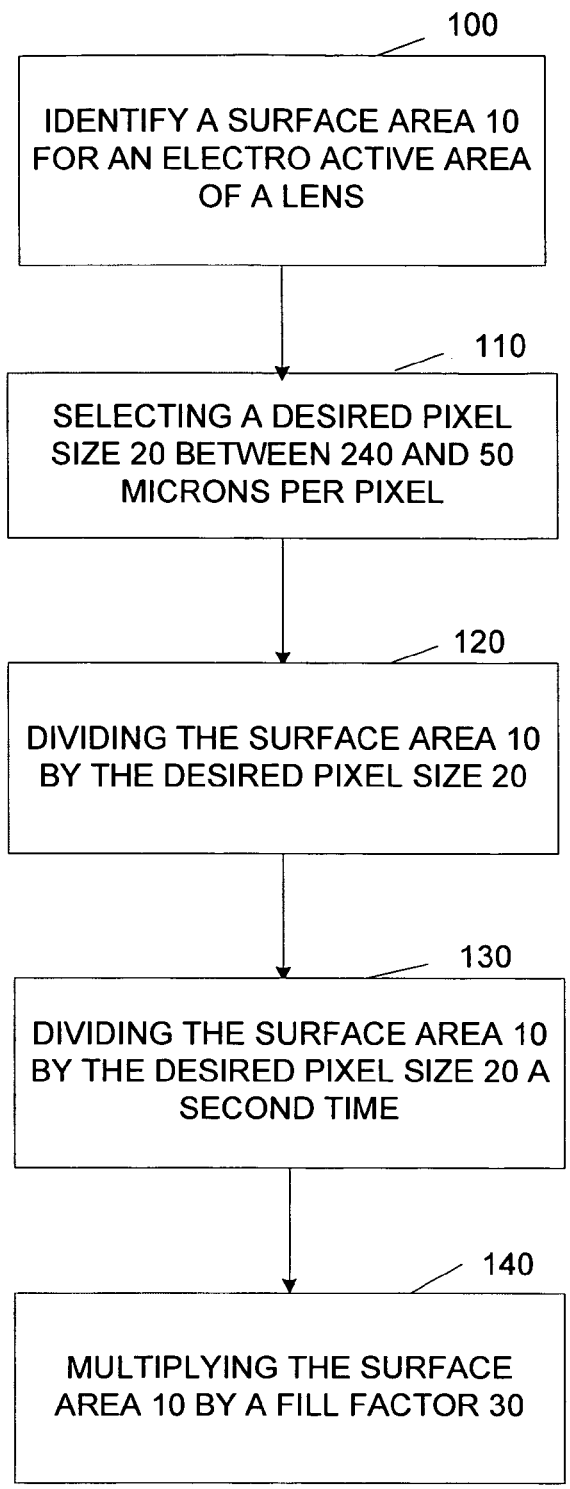
FIG. 1 is a flow diagram showing a process for the design of an electro-active lens adapted to correct higher-order aberration.

In a spectacle lens, the pixelated area will likely be nearly circular, as is the lens itself. However, a fundamental question remains unanswered. How many pixels will be required to adequately resolve a typical aberration? Some simple assumptions about the aperture and the resolution can be used to arrive at an estimate of the number of zones (pixels) needed to achieve adequate correction.

The basic question is one of quantization. Ideally, the change in index of refraction is a smooth function that mimics the curvature of the surface(s) of a "rubber" (flexible) or membrane mirror. In an electro-active lens with many pixels, the index of refraction is effectively constant across the entire pixel. Analogous to a system of tiny lenslets or micro-mirrors, the electro-active pixels have piston action but not tilt and tip (pan). Thus, the question becomes how many piston-like pixels are required per unit distance to adequately mimic a smooth surface for the purpose of creating a correction that yields satisfactory focusing improvement?

A typical eye's pupil size in ambient lighting is about 3-4 mm although the pupil may dilate to over 6 mm at night, when spherical aberration becomes a problem. A nominal value for the optical power of a typical high-order aberration (3$^{rd}$ order or higher) varies from about ¼ to ½ diopter in human eyes. Mathematical arguments can be made based on the diffraction limit of the eye, the resolution of the wavefront sensor one is using to measure the high-order aberrations, etc.

A more accurate estimate may be made based on previous experience with electro-active lenses for conventional aberrations. A typical electro-active lens of 15 mm diameter, using approximately 128 concentric circular zones, provides an optical efficiency of well over 80% when providing 2.0 diopters of optical power. Since the zones are circular, there are 128 electrode elements over each radius (the full diameter) of the lens, giving 256 zones to cover 15,000 microns, or a width of about 60 microns per electrode.

Comparing the circular electrode of the lower-order lens with the pixelated electrodes of the higher-order lens, the pitch of the pixels should be the same for the identical optical power to achieve similar optical efficiency of correction. However, as previously stated, the typical higher-order aberration does not exceed ½ diopter. Thus, to achieve a linear relationship between optical power and pixel pitch in order to further achieve a smooth change in index of refraction, the required pixel size would be 4 times larger, or about 240 microns/pixel. Obviously, better resolution of the aberration may be achieved with 100 or even 50 micron pixels.

FIG. 1 is a flow diagram showing a process for the design of an electro-active lens adapted to correct higher-order aberration, according to one embodiment of the present invention. At step 100, the surface area 10 of the electro-active area of the lens is identified. At step 110, a desired pixel size 20 between 240 and 50 microns per pixel is selected. The surface area 10 is divided by the desired pixel size 20 at step 120, and again at step 130. However, the pixels cannot touch each other because the electrodes would short out. To create a "dead" or insulating space between pixels, multiply by slightly less than one. The result is then multiplied by this fill factor at step 140.

Figure 2:
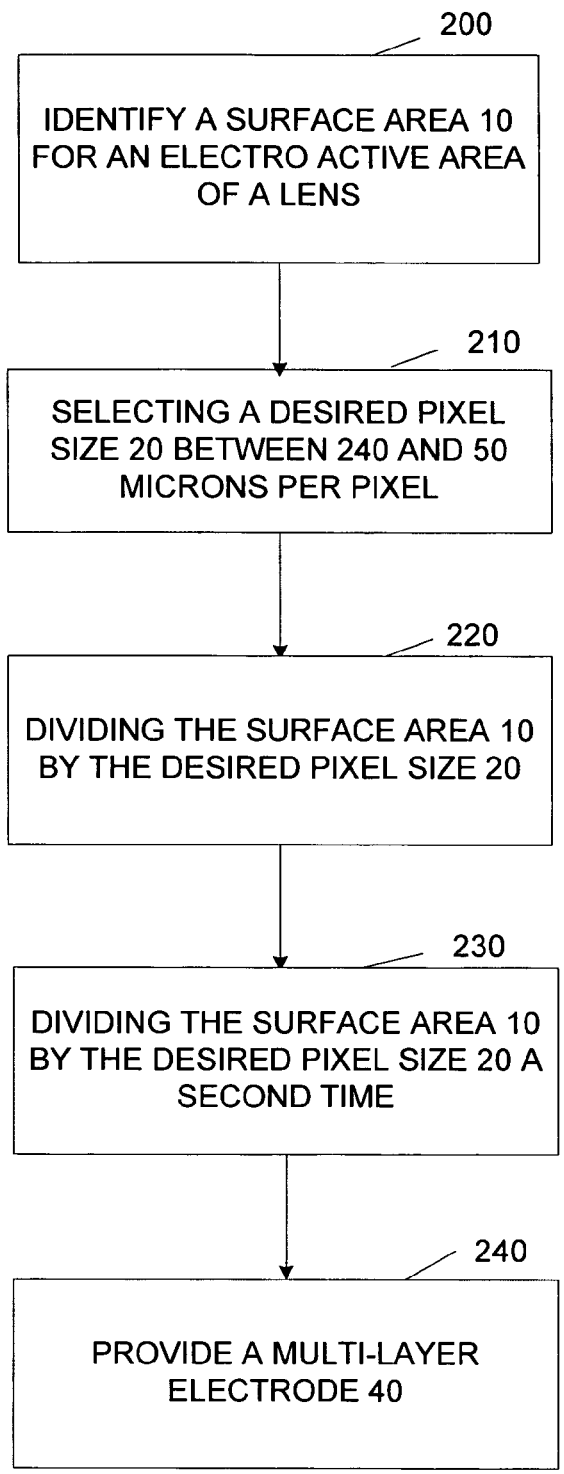
FIG. 2 is a flow diagram showing a process for the design of an electro-active lens adapted to correct higher-order aberration.

FIG. 2 is a flow diagram showing a process for the design of an electro-active lens adapted to correct higher-order aberration, according to another embodiment of the present invention. At step 200, the surface area 10 of the electro-active area of the lens is identified. At step 210, a desired pixel size 20 between 240 and 50 microns per pixel is selected. The surface area 10 is divided by the desired pixel size 20 at step 220, and again at step 230. A multi-layer electrode is provided at step 240, instead of multiplying by a fill factor to provide an insulating space between pixels.

Figure 3:
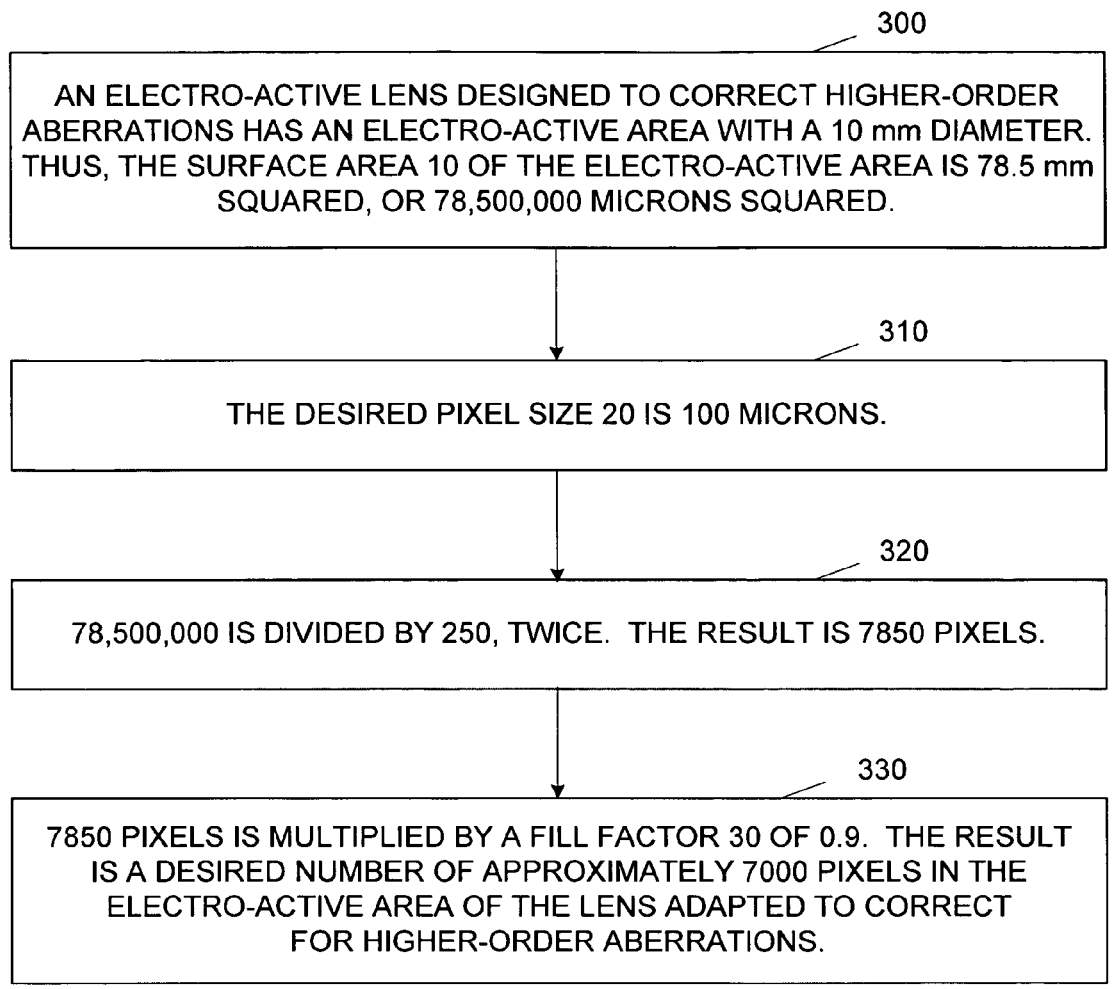
FIG. 3 is flow diagram showing a calculation of a desired number of pixels in an electro-active area of a lens adapted to correct higher-order aberrations, according to one embodiment of the present invention.

FIG. 3 is flow diagram showing a calculation of a desired number of pixels in an electro-active area of a lens adapted to correct higher-order aberrations, according to one embodiment of the present invention. By way of example only, a typical electro-active correction zone may have a 10 mm diameter. Thus, the surface area 10 of the electro-active area of the lens is identified as approximately 78.5 mm$^2$ or 78,500,000 microns$^2$ at step 300. A desired pixel size 20 of 100 microns is selected at step 310. Thus, by dividing the desired pixel size 20 into the surface area 10 twice, the number of pixels is calculated to be 7850 at step 320. However, the pixels cannot touch each other because the electrodes may short out. To create a "dead" or insulating space between pixels, multiply by slightly less than one. For example, assume a fill factor of 0.9 for the area and one finds that approximately 7000 pixels are required at step 330. In other embodiments, a multilayer electrode can be used to reduce or eliminate the gap between electrodes, reducing or eliminating the effect of fill factor on pixel count.

In another example, according to the method disclosed above, an electro-active zone that is 10 mm in diameter should have 1150, 6800 and 29,000 pixels for pixel sizes 250, 100 and 50 microns, respectively. Thus, we can identify a desired range for the number of pixels for a 15 mm diameter pixelated electro-active lens to correct for higher-order aberrations, as between 2600 and 16,200 pixels, with a pixel size of between 250 and 100 microns.

For a 10 mm lens, the desired range is between 288 and 116,000 pixels, with a pixel size of between 500 and 25 microns. A preferred range would be defined as between 1152 and 6800 pixels, with a pixel size of between 250 and 100 microns.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for determining the number of single-layer pixel electrodes in an electro-active lens having an electro-active pixilated portion that corrects for a higher order aberration of an eye, the method comprising:
    a) identifying a surface area of the electro-active pixilated portion;
    b) selecting a desired pixel electrode width between 240 and 50 microns per pixel for the electro-active pixilated portion;
    c) dividing said surface area by said desired pixel electrode width;
    d) dividing the value obtained in step "c" by said desired pixel electrode width;
    e) multiplying the value obtained in step "d" by a fill factor; and
    f) producing said electro-active lens.

2. The method of claim 1 wherein said fill factor is slightly less than 1.

3. A system for determining the number of single-layer pixel electrodes in an electro-active lens having an electro-active pixilated portion that corrects for a higher order aberration of an eye, the system comprising:
    a) a means for identifying a surface area of the electro-active pixilated portion;
    b) a means for selecting a desired pixel electrode width between 240 and 50 microns per pixel for the electro-active pixilated portion;
    c) a means for dividing said surface area by said desired pixel electrode width;
    d) a means for dividing the value obtained in step "c" by said desired pixel electrode width;
    e) a means for multiplying the value obtained in step "d" by a fill factor;
    f) a means for producing said electro-active lens.

4. The system of claim 3 wherein said fill factor is slightly less than 1.

* * * * *